United States Patent [19]
Griffith

[11] 4,342,954
[45] Aug. 3, 1982

[54] BATTERY CONDITIONING METHODS AND APPARATUS

[75] Inventor: Gerald W. Griffith, Tustin, Calif.

[73] Assignee: Laser Products Corporation, Fountain Valley, Calif.

[21] Appl. No.: 80,876

[22] Filed: Oct. 1, 1979

[51] Int. Cl.³ .......................... H01M 10/44; H02J 7/04
[52] U.S. Cl. .......................................... 320/14; 320/5; 320/21; 320/37
[58] Field of Search ...................... 320/2, 4, 5, 10, 11, 320/14, 21, 37, 38, 43, 44, 30

[56] References Cited

U.S. PATENT DOCUMENTS

| | | | |
|---|---|---|---|
| 3,421,067 | 1/1969 | Wilson et al. | 320/14 |
| 3,454,859 | 7/1969 | Ford et al. | 320/11 |
| 3,535,608 | 10/1970 | Cramer et al. | 320/14 |
| 3,564,382 | 2/1971 | King et al. | 320/44 X |
| 3,599,070 | 8/1971 | Davis | 320/5 |
| 3,603,861 | 9/1971 | Staats | 320/14 |
| 3,710,225 | 1/1973 | Herzig | 320/14 X |
| 3,947,743 | 3/1976 | Mabuchi et al. | 320/14 X |
| 4,179,648 | 12/1979 | Samsioe | 320/11 |

Primary Examiner—J. V. Truhe
Assistant Examiner—Richard M. Moose
Attorney, Agent, or Firm—Benoit Law Corporation

[57] ABSTRACT

In an effort to condition a battery for its current supply function, the electric charge required to restore the battery from a given first level to a higher second charge level is determined. A conditioning operation is comprised of a first step of reducing an unknown electric charge in the battery to the given first level, and a second step of introducing only the determined required electric charge into the battery. The battery is conditioned by administering in sequence the first step to reduce the unknown electric charge to the given first level and the second step to restore the battery to the higher second charge level by introduction of only the determined required electric charge into the battery.

29 Claims, 2 Drawing Figures

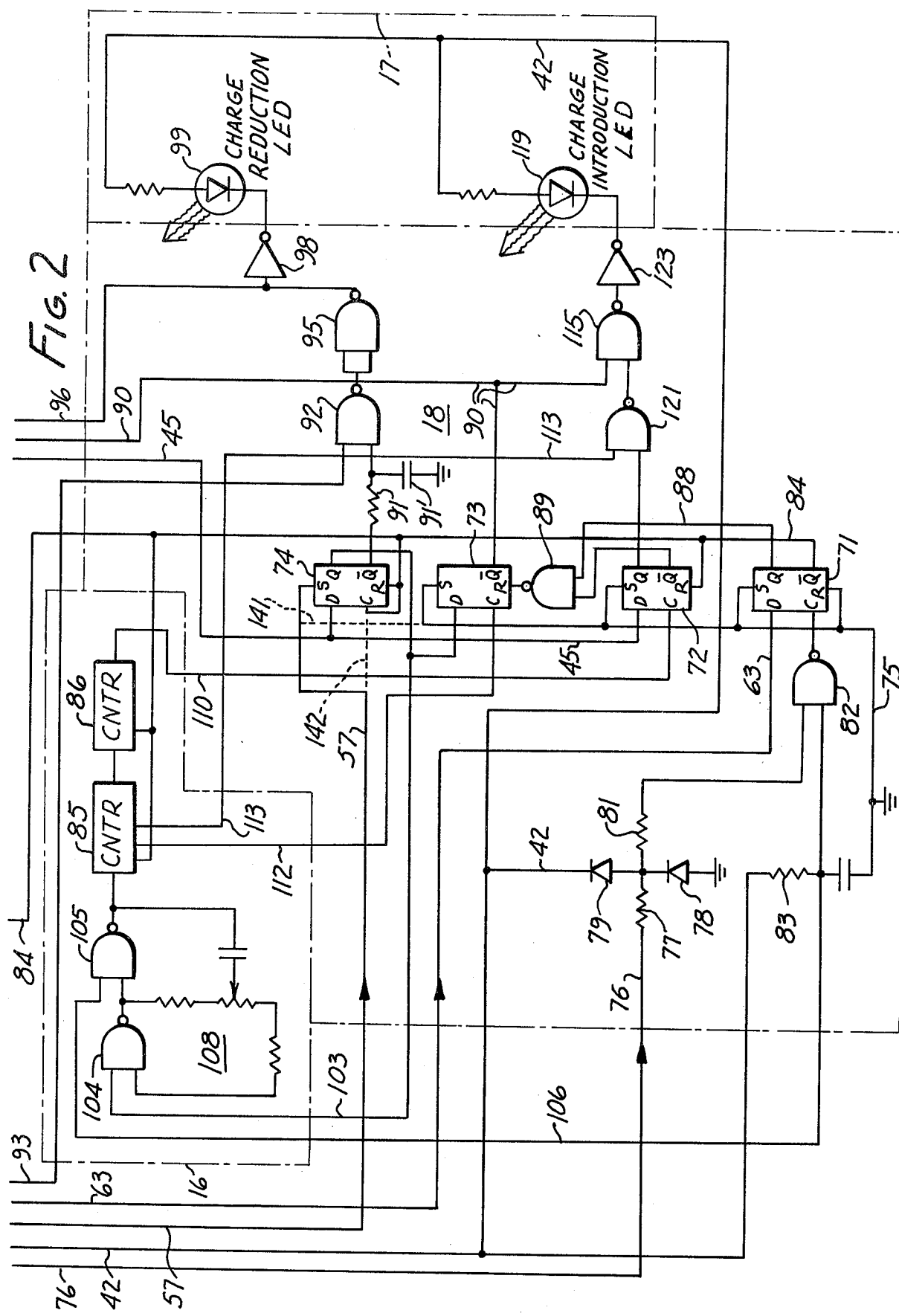

BATTERY CONDITIONING METHODS AND APPARATUS

BACKGROUND OF THE INVENTION

1. Field of the Invention

The subject invention relates to methods and apparatus for conditioning batteries, including secondary batteries, for their electric energy or current supplying operation or for an electric potential providing function. The subject invention relates also to methods and apparatus for utilizing batteries to their full capacity, and for minimizing such drawbacks as unwanted memory pheonomena, cell reversal, the lack of an external test for determining state of charge, and other deficiencies of certain secondary batteries.

2. Disclosure Statement

This disclosure statement is made pursuant to the duty of disclosure imposed by law and formulated in 37 CFR 1.56(a). No representation is hereby made that information thus disclosed in fact constitutes prior art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material through not necessarily being of itself pertinent.

It is well known that the state of charge of an electric battery cannot reliably be determined by a mere measurement of the battery voltage. According to a widespread practice, the specific gravity of the sulfuric acid electrolyte is measured in the case of liquid-electrolyte lead-acid batteries in order to gain information about the charge condition of the battery. Even though this method requires an inconvenient and hazardous manipulation of the acid electrolyte, the lack of a competitive better solution has perpetuated its practice.

Moreover, even that inconvenient and hazardous technique is unavailable in the case of sealed batteries and in the case of all nickel-cadmium cells and other batteries where the electrolyte is either inacessible or does not by its specific gravity indicate the level of charge of the battery. Apart from the fact that there is no external test which will indicate the state of charge for most battery types, it is also a familiar observation that conventional trickle and standby charging methods have uncertain effects on batteries. In fact, many nickel-cadmium battery and other rechargeable cell types suffer frequently unexplained losses of charging capacity commonly attributed to internal electrochemical phenomena.

Reference may in this respect be had to the article by Pensabene and Gould, entitled "Unwanted Memory Spooks Nickel-cadmium Cells" (IEEE Spectrum, Sept. 1976), pp. 33 to 36. While that article addresses itself to nickel-cadmium cells, it does describe various undesirable phenomena known with various types of secondary cells, including a detrimental memory effect diminishing charging capacity, a loss of contact between electron conductors, impregnated active chemicals, and the electrolyte, cell reversal and other disturbances in the battery's electrochemistry.

To alleviate these problems, there have been suggestions in the past that a secondary battery should simply be discharged from time to time to rid the battery of unexplained losses in charging capacity. Such arbitrary discharging is not only of questionable value as far as correction of electrochemical phenomena is concerned, but may in effect damage or destroy the battery, particularly in the case of batteries which suffer from a discharged state or from the heat generated by uncontrolled discharge.

Conversely, many battery charging methods expose batteries to a damaging overcharge.

SUMMARY OF THE INVENTION

It is a general object of this invention to overcome the disadvantages and meet the needs expressed or implicit in the above disclosure statement or in any other passage hereof.

It is a related object of this invention to provide improved battery conditioning methods and apparatus.

It is a germane object of this invention to provide improved methods and apparatus to condition batteries for their electric energy or current supplying operation or for an electric potential providing or other function.

It is also an object of this invention to provide improved methods and apparatus for introducing only a settable, predetermined charge or quantity of electricity into a rechargeable battery.

It is also an object of this invention to overcome the effects of a lack of an external test for determining state of charge for most batteries.

It is also an object of the subject invention to avoid loss of charging capacity and similar memory effects in rechargeable battery types.

Other objects of this invention will become apparent in the further course of this disclosure.

From one aspect thereof, the subject invention resides in a method of conditioning a secondary battery, comprising in combination the steps of predetermining for the particular type of battery the electric charge required to restore the battery from a predetermined first level to a higher second charge level, comprising a conditioning operation of a first step of reducing an unknown electric charge in the battery to said first level and a second step of introducing only said predetermined required electric charge into the battery, and conditioning the battery by administering to the battery in sequence said first step to reduce said unknown electric charge to said first level and said second step to restore the battery to said higher second charge level byintroduction of only said predetermined required electric charge into the battery.

From another aspect thereof, the subject invention resides in a method of conditioning a secondary battery, comprising in combination the steps of predetermining for the particular type of battery the electric charge required to restore the battery to a charged condition after discharge to a level represented by a predetermined battery voltage, comprising a conditioning operation of a first step of discharging the battery and a second step of introducing only said predetermined required electric charge into the battery applying to the battery only a predetermined number of coulombs in said second step, and conditioning the battery by administering to the battery said first step to discharge the battery, monitoring the voltage of the battery during said discharge, and administering to the battery, in response to realization of said predetermined battery voltage, said second step to restore the battery to said charged condition by introduction of only said predetermined required electric charge into the battery.

From another aspect thereof, the subject invention resides in apparatus for conditioning a secondary battery, comprising, in combination, first means in said conditioning apparatus for reducing an unknown electric charge in the battery to a predetermined first level, second means for introducing into the battery only a predetermined number of coulombs representing an electric charge predetermined ahead of the charging cycle as required to restore the battery from said first level to a higher second charge level, third means connected to said first and second means for connecting said first means and said second means in sequence to the battery whereby to restore the battery to said higher second charge level.

From another aspect thereof, the subject invention resides in apparatus for conditioning a secondary battery, cmprising, in combination, means in said conditioning apparatus for performing a discharge operation on said battery, means for monitoring the voltage of the battery, means for connecting said discharge operation performing means and said monitoring means to the battery, means connected to said monitoring means and to said discharge operation performing means for terminating said discharge operation in response to reduction of the voltage of the battery to a predetermined value, means for introducing into the battery only an electric charge required to restore the battery to a predetermined charged condition after said discharging manifested by said voltage reduction, and means for applying said introducing means to the battery upon disconnection of said discharging means.

Other aspect of the subject invention will become apparent in the further course of this disclosure.

BRIEF DESCRIPTION OF THE DRAWINGS

The subject invention and its various objects and aspects will become more readily apparent from the following description of preferred embodiments thereof, illustrated by way of example in the accompanying drawings, in which:

FIGS. 1 and 2 jointly constitute a circuit diagram of a battery charging system according to a preferred embodiment of the subject invention, with FIG. 2 to be placed below FIG. 1 with corresponding long sides of FIGS. 1 and 2 running in proximity.

DESCRIPTION OF PREFERRED EMBODIMENTS

Figure 1:
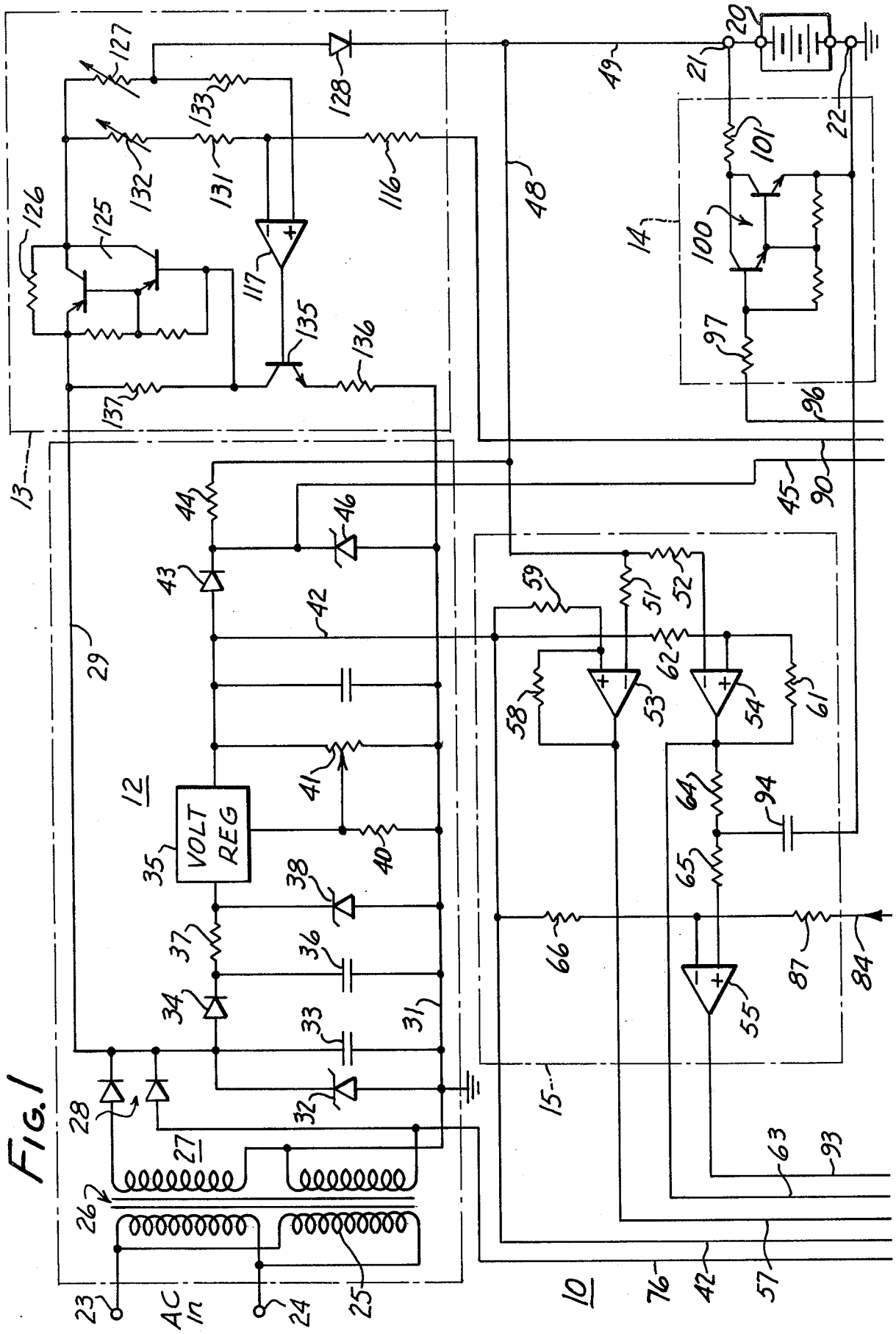

The battery charging and conditioning apparatus jointly shown in FIGS. 1 and 2 may be considered subdivided into power supply 12, charge circuit 13, discharge circuit 14, state detector 15, all shown in FIG. 1, and a timing circuit 16, battery conditioning indicator 17 and central control 18, shown in FIG. 2.

The nickel-cadmium or other secondary battery 20 to be conditioned and charged is connected between the positive terminal 21 and the grounded negative terminal 22 of the illustrated battery conditioner and charger. The battery 20 may either be connected to the terminals 21 and 22 between uses of the battery for power, voltage or current supply purposes, or the battery may remain connected to the terminals 21 and 22 while in a standby condition for emergency lighting, alarm system or other purposes.

The quantity of electricity or electric charge required to restore the battery 20 from a predetermined first level to a higher second charge level is either predetermined by the manufacturer of the particular type and kind of battery, or may be determined by measurement, such as with the aid of a coulomb or ampere-hour meter. In this respect, battery manufacturers typically indicate battery capacity in ampere hours or, for small batteries, sometimes in coulombs.

The battery charger and conditioner 10 according to the subject invention comprises the charging operation of a first step of reducing an unknown electrical charge in the battery 20 to a predetermined first level, and a second step of introducing only the above mentioned predetermined quantity of electrical charge into the battery 20.

The expression "electric charge" herein employed replaces the formerly used term "quantity of electricity" and designates the product of electric current multiplied by the time or generally the time integral of electric current or electron flow. A practical unit of electric charge or quantity of electricity is the coulomb, which has been defined as the quantity of electricity transferred by a current of one ampere in one second, or a quantity of $6.24 \times 10^{18}$ electrons. The electron is generally viewed as a charge carrier or, simply, as an electric charge.

By way of example, the discharge circuit 14 performs the mentioned first step by reducing an unknown electrical charge still present in the battery 20 to the mentioned first level. The charge circuit 13 and timing circuit 16 perform the mentioned second step by introducing only the mentioned predetermined required electric charge into the battery. The central conrol 18 conditions the battery by administering to the battery 20 in sequence the defined first and second steps. For example, the central control 18 is connected to the reducing or discharge circuit 14 and to the charge introducing circuit 13 for connecting the circuits 14 and 13, respectively, in sequence to the battery 20, whereby to restore the battery to the mentioned higher second charge level. Broadly speaking, the mentioned first level could be visualized as a discharged condition, and the mentioned higher second level as a charged condition of the battery 20. It should, however, be kept in mind that this so-called "discharged condition," in order to prevent damage to the battery, preferably is not carried to the extreme of a complete discharge. Also, as to the charged condition, care is observed to avoid overcharging or needless waste of electrical energy.

The state detector 15 determines when an unknown charge in the battery 20 has been reduced to the mentioned first level. While more voltage measurements typically do not provide a reliable indication of battery charge conditions, the state detector according to a preferred embodiment of the subject invention is capable of determining the occurrence of the mentioned first level by monitoring the voltage of the battery during controlled discharge.

The state detector 15 is thus sensitive to a discharge of the battery 20 to a level represented by a predetermined battery voltage.

The battery conditioner and charger 10 thus administers to the battery the first step to discharge the battery 20 with the discharge circuit 14, monitors the voltage of the battery with the state detector 15 during battery discharge, and administers to the battery, with the charge circuit 13 and timing circuit 16, in response to realization of the predetermined battery voltage, as sensed by the state detector 15, the mentioned second step to restore the battery 20 to its charged condition by introduction of only the predetermined required electric charge or quantity of electricity into the battery.

By way of example, the charge circuit 13 and timing circuit 16 cooperate in applying to the battery 20 in the mentioned second step only a predetermined number of coulombs representing the mentioned predetermined required electric charge. In this respect, the illustrated battery conditioner and charger 10 applies to the battery 20 an electric charging current as determined by the charge circuit 13 for only such time, determined by the timing circuit 16, as to realize the mentioned predetermined required electric charge.

By way of example, the battery charger and conditioner 10 may be energized from alternating-current power supply terminals 23 and 24 which, in turn, may be connected to primary windings 25 of a transformer 26 in the power supply 12.

The primary windings 25 selectively may be connectable in parallel and in series to accommodate different line voltages, such as 110 volts in one case and 220 volts in another.

The secondary windings 27 of the transformer 26 have rectifiers 28 connected thereto for full-wave rectification, providing direct current of a positive polarity at a lead 29 and of negative polarity at a grounded or earthed lead 31.

A zener diode 32 performs a line spike suppression function in the power supply 12. The main filter capacitor is at 33. A diode 34 isolates the voltage regulator 35 from the charge circuit 13. Further filter elements include a capacitor 36 and a resistor 37. A zener diode 38 performs an overvoltage protection function relative to the voltage regulator 35.

The voltage regulator 35 may be a conventional item, such as the type LM78L08 or LM78LXX as described, for instance, in the Voltage Regulator Handbook, by National Semiconductor Corporation, pp. 10-55 to 10-60.

Adjustments in the regulated voltage may be effected with the aid of a variable resistor 41 and series resistor 40. The regulated output voltage of the component 35 is applied as a supply voltage via line 42 to the circuits 15 and 17. Regulated output voltage of the component 35 is also applied via a diode 43 and lead 45 to delay or D inputs of flip-flop elements of the central control 18 and also to the power supply inputs (not shown) of the timing circuit 16 and control circuit 18. A zener diode 46 in the power supply 12 maintains a maximum voltage at the lead 45.

In practice, the diode 43 isolates the central control 18, and also the timing circuit 16, from the power supply 12 in the sense of permitting preservation of the current charge data or memory during periods of power loss. During such periods, current will flow from the battery 20 via a resistor 44 and leads 48 and 49 to the energizing lead 45.

As already indicated above, the state detector 15 monitors the battery voltage. To this end, the detector 15 has a lead 48 connected to the positive terminal 21 of the battery 20 via a further lead 49.

The lead 48, in turn, is connected via resistors 51 and 52 to inverting inputs of operational amplifiers 53 and 54. These operational amplifiers, as well as a further operational amplifier 55 of the state detector 15 may, for instance, be of the type LM3900 as described, for instance, in the Linear Data Book of National Semiconductor Corporation, pp. 3-204 to 3-212. The output of the operational amplifier 53 is connected to a lead 57. A feedforward resistor 58 is connected across the output and non-inverting input of the operational amplifier, which receives also the regulated supply voltage via lead 42 and resistor 59. Similarly, a feedforward resistor 61 is connected between the output of the non-inverting input of the operational amplifier 54, which receives also the regulated supply voltage via lead 42 and resistor 62.

The output of the operational amplifier 54 is connected to a lead 63 and via resistors 64 and 65 to the non-inverting input of the operational amplifier 55. The inverting input of the operational amplifier 55 is connected via resistor 66 to the regulated power supply lead 42.

The operational amplifier 53 detects a voltage which, in the opinion of the battery designer or user signifies a diminished charge condition rendering a charging cycle necessary or desirable. Merely by way of example, it may be noted that a prototype of the illustrated charger and conditioner was designed for a nickel-cadmium battery 20 of twelve cells. Also by way of example, the state detector circuitry including the operational amplifier 53 was designed and set so that the operational amplifier 53 produced a "diminished charge condition" signal at the lead 57 when the voltage of the battery 20 at terminal 21 had diminished to a value of 11 volts.

In the illustrated preferred embodiment of the subject invention, operation of the battery charger and conditioner 10 is initiated by inserting the battery 20 into a corresponding receptacle or cavity of the conditioner, disconnecting the battery from its load and connecting the battery to the terminals 21 and 22.

The voltage of a remaining charge in the inserted battery 20 causes the operational amplifier 54 in the state detector 15 to supply a "battery connected" signal through the lead 63 to the D-input of a flip-flop 71 in the central control 18.

By way of background, the central control 18 includes four bistable elements or flip-flops 71, 72, 73 and 74. The R or reset input of the flip-flop 71 and the S or set inputs of the flip-flops 71, 72 and 73 are disabled by grounding via a lead 75.

By reason of its function, the flip-flop 71 may be designated as "reset flip-flop." In order to signal to the flip-flop 71 in the central control 18 that power is being supplied to the power supply 12, a lead 76 conducts a line frequency signal from one of the transformer secondary windings 27 and applies such signal to a clipper including a resistor 77 and diodes 78 and 79. The clipped line frequency signal is applied via an isolation resistor 81 to an input of a NAND element 82. The other input of the NAND element 82 is connected via a resistor 83 to the power supply output lead 42 to sense the functioning of the power supply 12.

The NAND element 82 energizes the clock or C input of the reset flip-flop 71 in response to simultaneous presence of the instantaneous "power on" signal provided by the line frequency signal via lead 76 and the delayed "power on" signal provided by the direct-current power supply output via lead 42.

As long as no battery is connected at 21 and 22, the clocked flip-flop 71, with its $\overline{Q}$ output, maintains the flip-flops 72 and 74 and two counters 85 and 86 in a reset condition via a lead 84. The latter lead is also connected to the inverting input of the operational amplifier 55 via a resistor 87, in order to inhibit the cycle enable output of the state detector 15 when the $\overline{Q}$ output of the flip-flop 71 is high.

The $\overline{Q}$ output of the flip-flop 71 goes low in response to the above mentioned "battery connected" signal received via lead 63. At the same time, the "battery connected" signal is clocked by the output of the NAND element 82 to the Q output of the flip-flop 71. The latter Q output is applied by a lead 88 to an input of a NAND element 89.

The other input of the NAND element 89 is connected to the $\overline{Q}$ output of flip-flop 72, which remains high from the reset state.

The NAND element 89 initially applies a high output to the R or reset input of the flip-flop 73. In response to the Q output of the flip-flop 71, the output of the NAND element 89 goes low and thereby enables the flip-flop 73 which, by virtue of its function, may be designated a "charge enabling flip-flop." Because of the lack of a signal at its D input at that time, the flip-flop 73, however, does not then initiate a battery charging operation. Rather, the $\overline{Q}$ output of the flip-flop 73 provides the charge circuit 13 with a charge inhibit signal via a lead 90.

One input of a NAND element 92 receives via a lead 93 a "cycle enable" signal from the operational amplifier 55 in the state detector 15. The amplifier 55 derives the latter signal through a time delay network, including resistor 64 and a grounded capacitor 94, from the output of the operational amplifier 54 when the battery 20 has been connected to the terminals 21 and 22 and the $\overline{Q}$ signal from the flip-flop 71, applied via lead 84 and resistor 87, has gone low as described above.

The other input of the NAND element 92 is provided by the $\overline{Q}$ output of the flip-flop 74 via a time delay element including a resistor 91 and capacitor 91'. As a result of the reset via lead 84 and in the absence at the time of a high signal at its S input, the flip-flop 74 supplies the NAND element 92 with a high signal at its $\overline{Q}$ output.

The output of the NAND element 92 is inverted by a NAND element 95. Accordingly, a high signal is applied as a "discharge enable" signal via a lead 96 to the discharge circuit 14.

The discharge enable signal also effects via a driver 98 energization of a light emitting diode 99 connected to the power supply lead 42 in the indicator 17.

The diode 99 in the battery condition indicator 17 thus lights up, indicating to the observer or operator that the battery is being subject to a controlled discharge or charge reduction part of the battery conditioning operation.

Simultaneously, the conditioning or discharge enable signal proceeding via lead 96 to input resistor 97 enables a power transistor combination 100 in the discharge circuit 14 to subject the battery 20 to a controlled discharge via a resistor 101. By way of example, the discharge resistor 101 in the above mentioned prototype had a resistance of 12 ohms and a rating of 25 watts. By way of example, the component 100 may be an NPN silicon power transistor combination in a darlington connection. In the above mentioned prototype, such a transistor combination was obtained in the form of type 2N6387 as described, for instance, in the Motorola Power Transistors and Thyristors Device Data Book, pp. 4–285 to 4–288.

During the part of the conditioning operation effected by the discharge circuit 14, the state detector 15 monitors the voltage of the battery 20 via lead 48. In response to realization of a predetermined battery voltage by the discharge cycle, the state detector 15 applies via a lead 57 a "diminished charge condition" signal to the S or set input of the flip-flop 74. By way of example and as mentioned above, a prototype of the illustrated state detector 15 has been designed and set to apply the diminished charge condition signal via lead 57 upon reduction of the battery voltage to 11 volts, in the case of a 12-cell nickel-cadmium battery at 20.

Receipt of the diminished charge condition signal from the state detector 15 via lead 57 causes the flip-flop 74 via its $\overline{Q}$ output to terminate operation of the discharge circuit 14 and light emitting diode 99 by providing a low input at the NAND element 92. The above mentioned first step of the conditioning cycle is thus terminated.

Simultaneously, the Q output of the flip-flop 74 emits via a line 103 a signal energizing the data or D input of the flip-flop 73 and an input of a NAND element 104 in the timing circuit 16.

The timing circuit 16 includes counters 85 and 86 and a preset frequency oscillator including NAND elements 104 and 105. A first input of the NAND element 104 is energized via lead 103 by the Q output of the flip-flop 74 in response to receipt of the diminished charge condition signal via lead 57 from the state detector 15 as mentioned above.

In other words, the operation of the timing circuit 16 is initiated upon detection by the monitor 15 of the attainment of a predetermined battery voltage through operation of the discharge or conditioning function of the circuit 14.

The output of the NAND element 104 is connected to a first input of the NAND element 105. The second input of the NAND element 105 receives the delayed "power on" signal from the power supply output lead 42 via a lead 106. In the event of power failure, the signal in the lead 106 goes low, thereby suspending the operation of the timing circuit 16 without loss of an expended interval or memory of a commenced timing cycle, as further explained below.

A presettable frequency determining network 108 has components connected to the second inputs and the outputs of the NAND elements 104 and 105, as shown in FIG. 2.

The output of the NAND element 105 is connected to the input of the binary counter 85. The output of the last active stage of the binary counter 85, in turn, is connected to the input of the further binary counter 86. The output of the binary counter 86 is connected by a lead 110 to the clock or C input of the flip-flop 72. The number of stages of the binary counters 85 and 86 and the adjusted frequency of the oscillator comprised of 104, 105 and 108, determine the length of time for which the battery 20 is charged from the power supply 12 via circuit 13.

Prior to the appearance of an output signal at the lead 110, there will appear a first signal at an output of counter 85 connected to a lead 112 and then a second signal at an output of counter 85 connected to a lead 113.

By way of example, the lead 112 may be connected to the first stage of the counter 85, in order to clock in the Q output of the flip-flop 74 at the D input of the flip-flop 73 via the C input of the latter flip-flop.

In this manner, the $\overline{Q}$ output of the charge enable flip-flop 73 applies a low potential via lead 90 to one input of a NAND element 115 shown in FIG. 2 and, via a resistor 116 to the inverting input of an operational amplifier 117, which, for instance, may be of the above mentioned type LM3900.

In this manner, a charge inhibit signal provided as a high potential of the $\overline{Q}$ output of the flip-flop 73 is effectively removed and the second step of the battery conditioning cycle is enabled.

In other words, once the charge inhibit $\overline{Q}$ output of the flip-flop 73 is terminated through application of the Q output of the flip-flop 74 via lead 103 to the D input of the flip-flop 73 and clocking of the C input of the flip-flop 73 from counter 85 via lead 112, the introduction of a predetermined charge into the battery 20 through charging circuit 13 can commence.

At the same time, the second light emitting diode 119 is energized from the power supply lead 42 in the indicator 17 in order to indicate to the observer or operator, performance of the charge introduction part of the battery conditioning operation.

To this end, the Q output of the flip-flop 72 is connected to an input of a NAND element 121. Since no signal has been applied to the C input of the flip-flop 72 at that time, the Q output of that flip-flop applies a low potential to the NAND element 121, which in turn supplies a high potential to the second input of the NAND element 115.

As long as the lead 90 applies the high charge inhibit signal to the first input of the NAND element 115, the light emitting diode 119 remains dark. However, if, as now, the charge inhibit signal disappears at the first input of the NAND element 115, that NAND element operates through an inverting driver 123 to turn the light emitting diode 119 on; thereby indicating to the operator or user that introduction of an electrical charge into the battery 20 is in progress.

The enabled charge circuit 13 introduces an electrical charge into the battery 20 from the rectifiers 28 of the power supply 12 via lead 29, darlington-connected pass transistors 125, with shunt resistor 126, selected resistor 127, diode 128 and lead 49. The diode 128 isolates the charger 13 in intervals between charging operations.

The operational amplifier 117 in the charge circuit 13 has its inverting input connected to the above mentioned resistor 116 of the charge inhibit lead 90 and, via series-connected resistors 131 and 132, to the junction between the darlington transistors 125 and current sensing resistor 127. The resistor 127 may be variable or exchangeable for a determination of the charging current. The resistor 132 in the illustrated charge circuit 13 is variable to permit the charging current to be set.

The non-inverting input of the operational amplifier 117 is connected via a resistor 133 to the junction between the current sensing resistor 127 and the diode 128 or, broadly speaking, battery terminal 21. The operational amplifier 117 detects the charging current and, with its output, controls a level shifting transistor 135.

The transistor 135 has its emitter connected by a resistor 136 to ground and its collector by a resistor 137 to the unregulated direct-current supply lead 29. The collector of the level shifting transistor 135 is also connected to a base of the darlington transistor combination 125. By way of example, the component 125 may be a PNP darlington-connected silicon power transistor combination of the type TIP115 as shown, for instance, in the Power Semiconductor Data Book for Design Engineers (First Edition) by Texas Instruments Incorporated, CC-404, pp. 5-371 to 5-374.

The function of the operational amplifier 117 is to compare the electric currents flowing through the resistors 131 and 133 in response to the respective potentials at the upper end of the resistor 132 and the lower end of the resistor 127, as seen in FIG. 1.

The output of the amplifier 117 varies as a result of such comparison in order to cause the level shifting transistor 135 to control the forward bias of the darlington transistors 126 to maintain a constant charging current for the battery 20.

In this manner, the charging circuit 13 supplies an electric charging current at an essentially constant magnitude to the battery 20, while the timing circuit 16 limits the duration of such constant charging current for an application of only the above mentioned predetermined required electric charge to the battery 20.

The lead 113 is connected to one of the intermediate stages of the counter 85 so as to apply a square-wave signal to an input of the NAND element 121. When the second binary counter 86 times out, it applies a high output via lead 110 to the C input of the flip-flop 72. As a result, the $\overline{Q}$ output of the flip-flop 72 goes low, thereby causing the NAND element 89 to reset the flip-flop 73. This generates the above mentioned charge inhibit signal at the $\overline{Q}$ output of the flip-flop 73. This charge inhibit signal proceeds via lead 90 to terminate the operation of the charging circuit 13 and to turn off the light emitting diode 119 via NAND element 115.

Accordingly, the charge circuit 13 in the above mentioned second step of operation of the conditioner applies only a predetermined number of coulombs to the battery 20. In the illustrated embodiment of the invention, a predetermined charging current is applied to the battery for only such time as required to realize the predetermined electric charge.

In response to the mentioned timing out of the bina4ry counter 86, the Q output of the flip-flop 72 applies a high potential to the other input of the NAND element 121, thereby causing the light emitting diode 119 to flash at the frequency of the square-wave signal derived by line 113 from the counter 85.

In this manner, the operator or user is apprized of the completion of the two-step battery conditioning operation and may thus remove the fully conditioned battery 20 from the terminals 21 and 22.

The battery 20 may then be reconnected in its charged condition to an external load (not shown).

The removal of the battery 20 from the terminals 21 and 22 causes the state detector 15 to apply a low potential via lead 63 to the D input of the reset flip-flop 71, causing the control circuitry to reset.

The equipment is thus prepared for the execution of a further two-step battery conditioning operation carried out in the above mentioned manner.

If a dead battery is inserted into the equipment according to the illustrated embodiment, the state detector 15 is still able to initiate a charging or conditioning cycle, inasmuch as the operational amplifiers 53 and 54 are capable of receiving a certain current from the power supply via resistors 126 and 127 and diode 128, when the battery is dead or has a substantially diminished charge or voltage.

Accordingly, the battery conditioner and charger 10 will accept a battery at the terminals 21 and 22 which lacks a charge at the above mentioned first level or which lacks the above mentioned predetermined battery voltage for detection by the operational amplifier 53 and resulting provision of the "diminished charge condition" signal by the state detector 15. In that case, the illustrated equipment 10 will condition the latter battery by administering only the mentioned second step.

By way of example, part of the circuitry, such as the resistors 126 and 127 and diode 128 will provide at lead 48 a voltage corresponding to the above mentioned predetermined battery voltage signaling the diminished charge condition. The monitoring function and state detector 15 will respond to such corresponding voltage and the central control 18 and charge circuit 13 will administer to the latter battery only the mentioned second charge-introducing step.

In some instances, it is, however, not desirable that a charging cycle be initiated in response to a shorted or badly discharged battery. This is, for instance, the case if the presence of defective batteries is to be noted. Also, a shorted or badly discharged battery may not be restored to a satisfactory level of charge if only the predetermined quantity of electrical charge is applied thereto.

In order to prevent operation of the battery conditioner and charger against a dead battery, certain modifications of the illustrated circuitry may be effected. For instance, the S input of the flip-flop 74 may be grounded as indicated by a dotted line 141 and the C input disconnected from the reset line 84.

The lead 57, in turn, would then be switched from the S input to the C input of that same flip-flop 74, as indicated by the dotted line 142.

As a result, the flip-flop 74 can only be clocked if an inserted battery is capable of providing the above mentioned predetermined voltage, such as the above mentioned 11 volts in the mentioned prototype. The expression "dead battery" as herein employed is thus broad enough to cover also batteries discharged below a level considered to fall into the category of normal use in a given situation.

Accordingly, the modified form of the battery conditioner according to a preferred embodiment of the subject invention inhibits the conditioning function, or at least the above mentioned second step, with respect to batteries lacking a charge at the mentioned first level or lacking the mentioned predetermined battery voltage.

The illustrated preferred embodiment and aspects of the subject invention also provide performance of a battery conditioning or charging operation irrespective of failures in the source of power to which the terminals 23 and 24 of the power supply 12 are connected. By way of example, the power source for the conditioner or charger 10 may be the electric power generating or power line system of a public utility or municipal corporation.

As mentioned above, the signal in the lead 106 goes low in the event of power failure, thereby removing an input signal from the NAND element 105 in the timing circuit 16. The operation of the timing circuit 16 is thus suspended.

According to a preferred embodiment of the subject invention, and as already indicated above, such suspension of operation proceeds without loss of an expended interval or memory of a commenced timing cycle.

In particular, if a power failure occurs after performance of part of the above mentioned second step of a battery conditioning operation, then such second step is suspended at the occurrence of the power failure, but is resumed after a return of the power. The remainder of the temporarily suspended second step is performed to introduce the predetermined required electric charge into the battery during the sum of the mentioned part performed prior to the power failure and the remainder of the second step performed after return of the power. In other words, the above mentioned second step is completely performed irrespective of the occurrence of the mentioned power failure.

In this respect, the timing circuit 16 and central control 18 provide a memory of the performance of the battery conditioning operation, including its above mentioned second step. In the case of a power failure, such provided memory is employed after a return of the power to assure the introduction of the above mentioned predetermined required charge into the battery 20 during the sum of both the above mentioned part and the remainder of the second step of the battery conditioning operation.

In accordance with a preferred embodiment of the subject invention, the latter memory is sustained by energy from the battery 20 during failure of power from the source to which the power input terminals 23 and 24 are connected. By way of example, the presence of the resistor 44 in the power supply 12 and its connection between the leads 45 and 48 enables the flow of supply current from the battery 20 to the power supply inputs (not shown) of the flip-flops 71, 72, 73 and 74, and to the power supply inputs (also not shown) of the timing circuit 16 to which the lead 45 is connected. This in practice prevents the timing circuit 16 and central control 18 from losing the data of the performance of the conditioning operation stored therein. In particular, the counters 85 and 86 will remain at the count existing at the time of occurrence of the power failure, while the flip-flops in the central control 18 will remain set at their respective conditions which prevailed when the power failure occurred.

After return of power, the lead 42 will again be energized with direct-current supply power from the voltage regulator 35. Accordingly, the lead 106 connected to the lead 42 via resistor 83 will again apply a signal to the upper input of the NAND element 105, as seen in FIG. 2. The conditioning operation is thus resumed after a return of the power and the remainder of the interrupted conditioning operation is performed irrespective of the occurrence of a power failure.

The latter aspect of the invention has utility independently of the illustrated battery conditioning operation. For instance, such aspect of the subject invention may be employed in a method of charging a secondary battery from a source of power subject to failure. In that case, the electric charge required to restore the battery to a desired charged condition may again be predetermined, such as indicated above. The charging operation is suspended during the failure of the power occurring after performance of part of the charging operation. The timing circuit 16 including its NAND element 105 and the power supply sensing lead 106 may be employed for that purpose. The charging operation is resumed after return of power and the remainder of the charging operation is performed to introduce the predetermined electric charge into the battery during the sum of the part performed prior to the power failure and the remainder of the charging operation performed after the return of power. To this end, the counters 85 and 86 with driving oscillator components 104, 105 and 108 may be employed as shown in FIG. 2. In particular, a memory of the performance of the first part of the charging operation may thus be provided, and such provided memory may be employed after a return of power to assure the introduction of the predetermined electric charge into the battery during the sum of the first part and remainder of the charging operation. In this respect, such memory may be sustained by energy from the battery 20 during failure of power from the source to which the power supply input terminals 23 and 24 are connected.

The principle of the currently discussed aspect of the invention may be applied broadly to methods and apparatus for charging a secondary battery from a source of power subject to failure, when such methods and apparatus subject the charging of the battery to a control operation.

In that case, the subject invention may provide a continuity of such control operation after failure and return of power. In particular, the subject invention may provide such continuity with the aid of the electric energy derived from the battery during the failure of power.

In accordance with a preferred embodiment, a memory of the control operation up to the failure of power is provided, and such memory is sustained by energy from the battery during the failure of power. The continuity of the control operation is then established with the aid of such sustained memory. It is to be noted in this respect that the subject invention as just discussed sustains the requisite memory during power failure with exactly the battery that is being charged prior to and after cessation of the power failure.

In the illustrated preferred embodiment of the subject invention, the means for suspending the charging operation during a failure of power include the resistor 83, lead 106 and upper input of NAND element 105, as seen in FIG. 2. These means also effect a resumption of the charging operation after a return of the power at the supply 12. The means for assuring introduction of only the predetermined electric charge into the battery include the charging circuit 13 combined with the timing circuit 16. Similarly, the means for storing data of the performance of part of the conditioning or charging operation and for employing such stored data after a return of the power include the binary counters 85 and 86.

It will be recognized that the subject invention meets all its above mentioned objectives and provides improved battery conditioning and charging methods and apparatus. As a particularly advantageous benefit, the battery conditioning methods and apparatus of the subject invention improve the reliability and performance of the equipment powered by the battery 20, since the inventive conditioning operation assures that the battery 20 is always at the peak of its performance when it is reinserted into its intended load.

Operation of the battery conditioner and charger 10 does not depend on actuation of any on-off switch. Rather, the conditioner and charger according to a preferred embodiment of the subject invention automatically responds to the introduction of the battery 20 between terminals 21 and 22 to initiate the conditioning or charging cycle.

Also, the conditioner and charger according to a preferred embodiment of the subject invention automatically resets only on removal or disconnection of the battery 20 from the equipment or terminals 21 and 22. This feature prevents the equipment from being tricked into overcharging the battery, such as a result of faulty manipulation of one or more switches.

Moreover, the illustrated conditioner and charger in effect remembers or memorizes any phase of the conditioning operation, including the charge reduction cycle and also the charging or charge introduction cycle, as mentioned above, thereby preventing faulty conditioning operation or overcharging in the case of intervening power failures, or otherwise.

The subject extensive disclosure will render apparent or suggest to those skilled in the art various modifications and variations within the spirit and scope of the subject invention.

I claim:

1. A method of conditioning a secondary battery, comprising in combination the steps of:

predetermining for the particular type of battery the electric charge required to restore the battery from a predetermined first level to a higher second charge level;

comprising a conditioning operation of a first step of reducing an unknown electric charge in the battery to said first level and a second step of introducing only said predetermined required electric charge into the battery by applying to the battery only a predetermined number of coulombs in said second step; and conditioning the battery by administering to the battery in sequence said first step to reduce said unknown electric charge to said first level and said second step to restore the battery to said higher second charge level by introduction of only said predetermined required electric charge into the battery.

2. A method as claimed in claim 1, including:

accepting after said conditioning a battery lacking a charge at said first level; and conditioning the latter battery by administering only said second step.

3. A method as claimed in claim 1, wherein:

at least said second step is inhibited after said conditioning with respect to batteries lacking a charge at said first level.

4. A method of conditioning a secondary battery, comprising in combination the steps of:

predetermining for the particular type of battery the electric charge required to restore the battery to a charged condition after discharge to a level represented by a predetermined battery voltage;

comprising a conditioning operation of a first step of discharging the battery and a second step of introducing only said predetermined required electric charge into the battery by applying to the battery only a predetermined number of coulombs in said second step; and conditioning the battery by administering to the battery said first step to discharge the battery, monitoring the voltage of the battery during said discharge, and administering to the battery, in response to realization of said predetermined battery voltage, said second step to restore the battery to said charged condition by introduction of only said predetermined required electric charge into the battery.

5. A method as claimed in claim 4, including:

accepting after said conditioning a battery lacking said predetermined battery voltage;

providing a voltage corresponding to said predetermined battery voltage; and administering to said battery lacking a charge at said first level only said second step in response to said provided corresponding voltage.

6. A method as claimed in claim 4, wherein:

at least said second step is inhibited after said conditioning with respect to batteries lacking said predetermined battery voltage.

7. A method as claimed in claim 1 or 4, wherein:
said conditioning operation is energized from a source of power;
at least said second step is suspended during a failure of said power occurring after performance of part of said second step; and
said suspended second step is resumed after a return of said power and the remainder of said second step is performed to introduce said predetermined required electric charge into the battery during the sum of said part and said remainder of said second step.

8. A method as claimed in claim 7, wherein:
a memory of said performance of said part of said second step is provided; and
said memory is employed after a return of said power to assure the introduction of said predetermined required electric charge into the battery during the sum of said part and said remainder of said second step.

9. A method as claimed in claim 8, wherein:
said memory is sustained by energy from said battery during failure of power from said source.

10. A method as claimed in claim 1 or 4, wherein:
only said predetermined required electric charge is introduced into said battery by applying to the battery a predetermined charging current for only such time as to realize said predetermined quantity.

11. A method of charging a secondary battery from a source of power subject to failure, comprising in combination the steps of:
predetermining the electric charge required to restore the battery to a desired charged condition;
suspending said charging during a failure of said power occurring after performance of part of said charging; and
resuming said charging after a return of said power and performing a remainder of said charging to introduce said predetermined electric charge into the battery during the sum of said part and of said remainder of the charging.

12. A method as claimed in claim 11, wherein:
a memory of said performance of said part of the charging is provided; and
said memory is employed after a return of said power to assure the introduction of said predetermined electric charge into the battery during the sum of said part and said remainder of the charging.

13. A method as claimed in claim 12, wherein:
said memory is sustained by energy from said battery during failure of power from said source.

14. A method of charging a secondary battery from a source of power subject to failure, comprising in combination the steps of:
subjecting said charging to a control operation; and
providing a continuity of said control operation after failure and return of said power, with the aid of electric energy derived from said battery during said failure of power.

15. A method as claimed in claim 14, wherein:
a memory of said control operation up to said failure of power is provided;
said memory is sustained by energy from said battery during said failure of power; and
said continuity of the control operation is established with the aid of said memory.

16. Apparatus for conditioning a secondary battery, comprising in combination:
first means in said conditioning apparatus for reducing an unknown electric charge in the battery to a predetermined first level;
second means for introducing into the battery only a predetermined number of coulombs representing an electric charge predetermined ahead of the charging cycle as required to restore the battery from said first level to a higher second charge level;
third means connected to said first and second means for connecting said first means and said second means in sequence to the battery whereby to restore the battery to said higher second charge level.

17. Apparatus as claimed in claim 16, including:
means for conditioning a battery lacking a charge at said first level by administering only said second step.

18. Apparatus as claimed in claim 16, including:
means inhibiting at least said second step with respect to batteries lacking a charge at said first level.

19. Apparatus for conditioning a secondary battery, comprising in combination:
means in said conditioning apparatus for performing a discharge operation on said battery;
means for monitoring the voltage of the battery;
means for connecting said discharge operation performing means and said monitoring means to the battery;
means connected to said monitoring means and to said discharge operation performing means for terminating said discharge operation in response to reduction of the voltage of the battery to a predetermined value;
means for introducing into the battery only an electric charge predetermined ahead of the charging cycle as required to restore the battery to a predetermined charged condition after said discharging manifested by said voltage reduction; and
means for applying said introducing means to the battery upon disconnection of said discharging means.

20. Apparatus as claimed in claim 19, wherein:
said introducing means include means for applying to the battery a predetermined number of coulombs representing said required electric charge.

21. Apparatus as claimed in claim 16 or 19, wherein:
said introducing means include means for applying to the battery a predetermined charging current for such time as to realize only said required charge and means for automatically deactivating said current applying means upon attainment of said time.

22. Apparatus as claimed in claim 16 or 19, including:
means for energizing said conditioning from a source of power;
means connected to said introducing means for suspending said conditioning during a failure of said power occurring after performance of part of the introduction of said electric charge and for resuming said conditioning after a return of said power for a remainder of said conditioning; and
means connected to said introducing means for causing the introduction of said predetermined required electric charge into the battery during the sum of said part and said remainder.

23. Apparatus as claimed in claim 22, wherein:
said means for causing the introduction of said required electric charge include means for storing data of said performance of part of the introduction of said electric charge and for employing said stored data after a return of said power to assure the introduction of said predetermined required electric charge into the battery during the sum of said part and said remainder.

24. Apparatus as claimed in claim 23, including:

means connected to said data storing means for deriving energy from said battery and sustaining storage of said data with said derived energy during failure of power from said source.

25. Apparatus for charging a secondary battery from a source of power subject to failure with a predetermined electric charge, comprising in combination:

means for suspending said charging during a failure of said power occurring after performance of part of said charging and for resuming said charging for a remainder of a charging operation after a return of said power; and means connected to said suspending and resuming means for assuring introduction of said predetermined electric charge into the battery during the sum of said part and said remainder.

26. Apparatus as claimed in claim 25, wherein:

said assuring means include means for storing data of said performance of part of said charging and for employing said stored data after a return of said power to assure introduction of said predetermined electric charge into the battery during said sum of said part and said remainder.

27. Apparatus as claimed in claim 26, including:

means connected to said storing means for deriving energy from said battery and sustaining storage of said data with said derived energy during failure of power from said source.

28. Apparatus for charging a secondary battery from a source of power subject to failure, comprising in combination:

means for subjecting said charging to a continuous control operation;

means for deriving energy from said battery during failure of said power; and means connected to said deriving means and said subjecting means for employing said derived energy from the battery to assure the continuity of said control operating after failure and return of said power.

29. Apparatus as claimed in claim 28, wherein:

said assuring means include means for storing data of a performance of said control operation prior to failure of said power, means for sustaining storage of said data during said failure with said derived energy from the battery, and means for establishing the continuity of said control operation with the aid of said stored data after return of said power.

* * * * *